(12) United States Patent
Gardner

(10) Patent No.: US 9,961,843 B2
(45) Date of Patent: May 8, 2018

(54) PROCESS TO HARVEST ORGANIC MATERIALS FROM TREES

(71) Applicant: Kevin Gardner, Columbia, SC (US)

(72) Inventor: Kevin Gardner, Columbia, SC (US)

( * ) Notice: Subject to any disclaimer, the term of this patent is extended or adjusted under 35 U.S.C. 154(b) by 0 days. days.

(21) Appl. No.: 15/299,368

(22) Filed: Oct. 20, 2016

(65) Prior Publication Data

US 2017/0112077 A1    Apr. 27, 2017

Related U.S. Application Data

(60) Provisional application No. 62/404,039, filed on Oct. 4, 2016, provisional application No. 62/244,743, filed on Oct. 22, 2015.

(51) Int. Cl.
*A01G 23/14* (2006.01)
*A01G 17/18* (2006.01)

(52) U.S. Cl.
CPC ............. *A01G 23/14* (2013.01); *A01G 17/18* (2013.01)

(58) Field of Classification Search
None
See application file for complete search history.

(56) References Cited

U.S. PATENT DOCUMENTS 4,176,495 A * 12/1979 Dale ......................... A01G 7/06 47/10
4,203,253 A * 5/1980 Wolter ................... A01G 23/10 47/10
5,224,289 A * 7/1993 Buzzell ................. A01G 23/14 285/361

FOREIGN PATENT DOCUMENTS

CN    101960977 A * 2/2011

OTHER PUBLICATIONS

Holmes, F.W. 1982. Distribution of dye in elms after trunk or root injection. Journal of Arboriculture 8(9): 250-252. specif. pp. 250, 251.*
Plants in Action. Solute transport via transpiration. Plants in Action. Macmillan Education Australia Pty Ltd. (publishers). Copyright 1999. Australian Society of Plant Scientists. Ed.: Brian Atwell, Paul Kriedeman & Colin Turnbull. Queensland, Australia. p. 2.*
Eng.MT-Wu. Sap suction device. Chinese Patent Application Publication No. CN101960977(A); Feb. 2, 2011. specif. p. 1.*
Walters, R.S. 1978. Tapholes in sugar maples: what happens in the tree. Forest Service General Technical Report. NE-47. pp. 1-12. specif. p. 2.*
Sheneman, J.M. et al. 1958.Correlation between microbial populations and sap yields from maple trees. Michigan Agricultural Experiment Station. Presented at Annual Meeting of IFT. pp. 152-159. specif. p. 152, 158.*
Chantuma, P. et al. 2009. Carbohydrate storage in wood and bark of rubber trees submitted to different level of C demand induced by latex tapping. Tree Physiology 29: 1021-1031. specif. pp. 1021.*

* cited by examiner

*Primary Examiner* — Renee Claytor
*Assistant Examiner* — Sharon M. Papciak
(74) *Attorney, Agent, or Firm* — Smith, Gambrell & Russell, LLP

(57) ABSTRACT

A process for harvesting organic material recovers sugars, proteins, aromatics, organic acids and mixtures thereof, from the sapwood of trees or recently pruned sections, e.g. branches. The process involves drilling entry and exit ports to access the sapwood layer and the use of spiles, driven into the ports, to create fluid tight seals for the tubing, which delivers and recovers the solution, which solubilizes the harvested organic material and flows through the sapwood layer. The close proximity of entry and exit ports permits the flow of a pressurized solution. The recovered pumped solution or products therefrom, if desired, can be used in a fermentation medium to prepare products, e.g. alcohol, fatty acids.

9 Claims, 1 Drawing Sheet

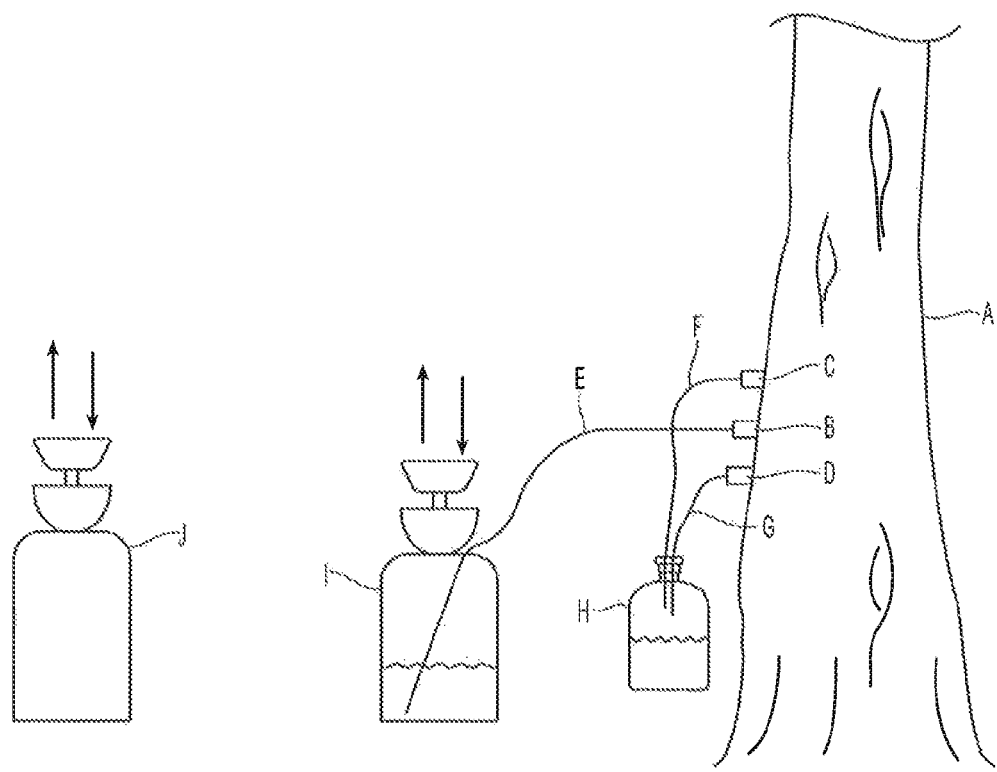

PROCESS TO HARVEST ORGANIC MATERIALS FROM TREES

BACKGROUND OF THE INVENTION

1. Field of Invention

My invention relates to the harvesting of soluble organic materials from trees using a pressurized solution system.

2. Background of the Invention

Humans have been utilizing carbohydrates since the dawn of time; our very existence depends on them. It's no surprise then that sugar has hundreds of uses, either directly in human consumption, or indirectly as a substrate for various processes and products. Food, chemicals, fuel, polymers, and so much more, are a direct result of carbohydrate use. Presently, most of the sugar people utilize originates from agricultural activity. Crops are grown and harvested, typically in an annual cycle, throughout the world to supply our need for sugar. The growing demand for carbohydrates over the centuries has caused many innovations in the field of agriculture to increase carbohydrate supply in society. Although the innovations have been great, more innovations are needed to keep up with the world's growing population and sequential demand for carbohydrates.

The main disadvantage with traditional agriculture is that most crops are annual plants; they grow and die every year and must be replanted each growing season. This annual cycle is resource intensive, requiring many materials to plant, maintain, and harvest the crops year after year. If the end goal is a larger sugar supply, then alternatives and supplements to the traditional annual agricultural cycle should be explored. One possible solution to increase sugar supplies is to use perennial plants, crops that live for many seasons. The use of perennial plants would decrease the resources needed to create sugar as the whole plant does not have to be regrown every year; only the fruit is taken, leaving the plant behind for the next growing season. Some plants, such as the apple tree, can live and produce fruit for decades before needing to be replaced. Although perennial plants require fewer resources, their main disadvantage is that harvesting their fruit is normally labor intensive. Since the objective is to keep the plant alive, often the fruit from the plant must be harvested by hand as to not accidentally harm the plant with machinery. Thus, one must reduce the labor of the perennial sugar harvest to make the process more economical.

To reduce the labor cost for perennial sugar production, new ideas on utilizing perennial plants may be essential. The research and development for perennial plants is lacking particularly with one of the more productive groups of perennials, trees. Trees are a group of perennial plants that are dynamic photosynthesizers. Trees are normally known for the production of wood; however, a tree's photosynthetic product is similar to that of traditional crops. This sugar, e.g. sucrose, is desirable for utilization. In most trees, these sugars are used by the tree to produce wood rather than a harvestable crop of soluble sugars. Thus, trees are difficult to utilize for sugar production since they so often turn their photosynthate into wood. There are notable exceptions (apples, oranges, etc.), however most trees normally want to grow larger and increase their canopy so they can compete for sunlight; thus, wood production is vital for trees so that they can grow and compete for solar resources.

Trees are highly productive organisms, usually requiring very little inputs and having high outputs. Trees can grow on a piece of land indefinitely with little to no human involvement whatsoever. Trees can also live a very long time. They are in many ways ideal photosynthesizers in their structure, function and longevity. However, very few people have pursued a process to take advantage of a tree's photosynthetic potential by using them as a resource for photosynthate harvest. Instead people normally harvest trees for their wood. Nevertheless, tons of soluble sugar will be produced by a mature forest in a single season; consequently, a potential exists to harvest sugar if there was a technology to extract soluble sugars. The goal would be to harvest those sugars before the tree had a chance to use them for other purposes, such as wood production. If a manual extraction of soluble sugars could be developed, then a tree could be useful for a sugar harvest. Of course, not all of the sugar produced by photosynthesis can be harvested; some sugar is needed for respiration, repair, and the general health and metabolism of the tree. The goal is not to glean all of the sugar from a tree, but rather, to divert some of its photosynthate to a harvestable extract for utilization.

A manual extraction of sugar from trees would be unrelated to the action of harvesting sap from sap producing trees, such as the maple tree. The sap flow, from which sap harvesting occurs, is a natural phenomenon during a very short season in late winter or early spring. During this time, starch reserves from within the tree are broken down to create sap (mostly sucrose), which is delivered to the stems of a tree in preparation of leaf production. With sap harvesting, there is typically enough excess sugar and pressure from within the tree so that one can harvest sap by simply cutting or tapping into a sap producing tree. Cutting the tree allows the sap to flow from the tree. The sap is then usually cooked to produce syrup or sugar. The flow of sap is a natural process; it takes place in a limited geographical area (mostly the Northern United States and Southern Canada) and only for a few weeks each year. Harvesting sap only produces a small amount of soluble sugar from each tree and it only occurs in a few types of hardwood trees.

By contrast, manually extracting sugar from a tree does not rely on storage reserves; the process can glean newly created sugar from photosynthesis. The process would have a large impact for creating soluble sugar from trees since it could operate throughout the whole growing season for the tree, while photosynthesis is occurring. The process would work on many different types of trees, both hardwoods and softwoods. Also, the process would not be confined to a geographical area, but could work in most places where trees already grow. Extraction could occur throughout the majority of the warm months of the year when photosynthetic sugar within the tree is plentiful. By contrast, sap flow is before the warm months, when trees lack leaves and photosynthesis; when no new sugar is being produced. There is to my knowledge no prior art to accomplish harvesting soluble sugars from within a tree before they are consumed by the tree for other uses. This is in large part because the sugars are inaccessible, bound within the tree, protected by tree bark and by the wood itself.

Objects and Advantages

My invention to use a pressurized solution of dissolved materials to harvest organic materials from trees is advantageous in that its potential impact to increase sugar supplies is large. The process can take land that is not producing harvestable sugar and turn it into a carbohydrate rich resource. The process produces high amounts of carbohydrates, is less resource and labor intensive than many agricultural crops, and can be used season after season since a tree's lifespan is very long. Also, there are abundant forestry resources that can be utilized for this process. Furthermore, forestry resources generally do not compete with agricultural resources, so by utilizing forests for carbohydrate production, the process does not generally compete with agriculture.

DESCRIPTION OF THE DRAWINGS

FIG. 1 is a front view of the equipment and materials used to harvest sugar from trees. The depicted setup is for harvesting sugar from a single tree as described in Example 2.

DETAILED DESCRIPTION OF THE INVENTION

The core of my invention is to work with the natural osmotic mechanisms of trees to harvest sugar. When photosynthesis occurs in a tree it generates soluble sugars within the leaf (or needle) of the tree. Some of this generated sugar will be used by the leaf, while the remaining sugar will be used in other parts of the tree; this excess sugar exported from the leaf is the carbohydrate my process seeks to extract. Within trees, sugar needs to be transported from the leaf to other parts of the tree so that the tree can function properly. This transportation of sugar within a tree is regulated by the phloem. The phloem delivers sugar and nutrients to various places in the tree depending on where there is a demand for sugar. The phloem is driven by osmotic pressures. In areas where there is a high concentration of sugar, water flows to that area causing osmotic pressure to build. This pressure allows the phloem to move the sugar from high concentrated areas (a sugar source) to areas where less sugar is available (a sugar sink). The process is reversible depending on where sugar is needed.

My invention works by manipulating the transportation of sugar within a tree by employing its osmotic potentials. This is done simply by creating a pathway into a tree so that those osmotic factors can be engaged. In my process, a pathway is established by drilling holes into a tree so that a solution can be injected into the tree to begin the process of harvest. Holes must be drilled into the tree so that physical access to the sapwood of the tree is established. Spiles are then hammered into these holes and tubing attached to those spiles. Once connected, this tubing system will deliver the injecting solution needed to harvest sugar or other desired product from the tree. This water-based solution contains various solutes that, once injected into the tree, interact with the tree's sapwood to harvest sugar or other desired product. The goal of the solution is to engage with the tree's cells in the area of injection to create an artificial sugar sink. By creating a sugar sink, the tree will deliver sugar to the area from sugar sources for harvest. The samples I have recovered from trees after injections appear to be rich in organic material and effective for utilization. My attempts to ferment some of these collected samples have been successful, with ample sugar present for yeast to consume. These results suggest that sugar recovered from trees is useful.

The delivery and recovery of solution from a tree requires drilling at least two holes into the tree to create an entry and an exit from the tree where spiles and tubing can be attached. Solution is injected into the tree at an entry port and is then recovered from the tree at an exit port. The solution entering the tree travels through the tree's sapwood with pressure created by the pump which injects the solution. The solution, now enriched with sugar, then flows out of the tree at the exit port where it is recovered. By tapping into a tree with an entry port and an exit port, water and soluble materials are allowed to flow into and out of a tree, thus harvesting sugar. Given that my invention relies on a tree's osmotic mechanisms, the process of pumping in solutes to harvest sugar can be repeated indefinitely. As long as there are sufficient sugars at the tree's sugar sources, it can send sugar to its sugar sinks, replenishing harvested sugar.

My research suggests that many different solutes may be used to create an osmotic response in a tree's sapwood. However, my research also shows that solutes will have a different response depending on the type of tree being used for harvest. Every solute one uses within a tree has the potential to respond differently depending on internal factors (species of the tree, cell structure, etc.) and external factors (environment, season, weather, etc.). Consideration should be made regarding the solutes that are added to an injection solution as to; what type of osmotic potential the solute has, the potential for the solute to inhibit or activate cells within the tree, what sort of co-factor the solute may have on enzymes in the tree, the effect of pH the solute will have on the solution, and how likely the solute will be absorbed by the tree. Also, one must consider; how toxic the solute is to the tree, how the solute will affect the flow rate through the tree, and if it could potentially damage cells within the tree. For all injection solutions, enough of the selected material must be added to the solution to meet the threshold of solutes needed to create an osmotic response; too few solutes may not create an osmotic response.

Generally speaking, it is a best-practice approach to use only the natural soluble materials that one normally finds within a tree when selecting solutes for an injection solution. This approach helps insure that the solutes in an injection solution will not harm the tree. My solute of choice for this process is typically sucrose, common table sugar. Sucrose is often my choice of solute because it is the material a tree normally uses to transport energy throughout the tree. Leaves export sucrose to the rest of the tree, and thus by using sucrose to manipulate a tree's transportation system, it engages a tree's osmotic mechanisms effectively. However, it must be stressed that this process is not limited to sucrose but has shown varying levels of success with many solutes. These solutes include organic materials such as various carbohydrates, plant extracts, protein, amino acids and organic acids. It also includes inorganic salts.

When injecting a solution into the sapwood of a tree, my research suggests one of three things will occur. As the solution moves through the tree it will either be absorbed by the tree, move passively through the tree, or increase in solutes as it moves through the tree. This can easily be observed by comparing the density of an injection solution before it enters into a tree and after it exits the tree, revealing how that particular solution engaged the sapwood. Each response reveals key information about a tree's physiology and how to best approach a harvesting scheme. The type of interaction a solute will have with each tree may change given the time of year and concentration of the solute being used. Thus, it is a variable response given numerous factors. Not only can the response of a tree be variable with a solution, but the composition of the solution itself may change too given different factors. With injections, there's a potential for there to be an alteration in the solution as it engages with the tree's cells, even if the density of the solution remains the same. I have often observed, for example, a change with sucrose that appears to have undergone partial hydrolysis after traveling through the sapwood of a tree even though the density of that solution remained the same. Thus, it is possible not only to either have a gain or loss of solutes from injections, but, also a change in product depending on the solute being used.

One of the best ways to investigate how a material may react with the sapwood of a tree is to look at shade tolerance. Shade tolerance is a classification of how well trees perform with a lack of solar resources. Sunlight drives photosynthesis in all trees, however, only some types of trees can tolerate shady conditions and the less photosynthate that results from shade. Trees that perform well in shady conditions are generally labeled as shade tolerant; those that do not perform well in shady conditions are normally labeled shade intolerant. Trees are grouped on a spectrum ranging from very shade tolerant to very shade intolerant according to their ability to cope with a lack of sunshine.

The classification of shade tolerance is helpful in suggesting how solutes may interact with a tree because both shade tolerant and shade intolerant trees have general characteristics with how they use and store their photosynthate. Shade tolerant trees are more conservative with their sugar resources than shade intolerant trees and are more likely to store their photosynthate because of their prudent nature. Shade intolerant trees tend to use their photosynthate rather than store it because they are in a rush to grow and compete for sunlight since they do not perform well in shady conditions. Thus, since the sapwood is a storage organ, one can guess if a tree is likely to absorb solutes from an injection based on shade tolerance.

For my invention, there are two techniques to employ for harvesting solutes from trees via injection:

1) Single-Injection: The first technique is a single, continuous injection of solutes into a tree with the intent of gaining solutes immediately from that injection. This is the simplest method and would be able to run with as little as two lines; one entry port and one exit port. Once injected, the solutes would cause an osmotic stress that would be relieved by the release of solutes from the cells in the area of injection, thus, enriching the solution before it exits the tree. This technique may be more applicable to shade intolerant trees since they are more likely to respond by releasing solutes. Shade tolerant trees on the other hand are more likely to simply absorb solutes from injections. My experimentation has shown modest gains in solutes from known shade intolerant trees. For example, a 2.5% sucrose solution injected into the sapwood of two juvenile trees, a Tulip Poplar and a Pin Oak, both showed a slight gain of solutes by 8% and 12% respectively.

While a simple technique to employ, the challenge with this method is getting the concentration of the solute correct. My research shows that if the concentration is too low, it will be passive through the sapwood. If the concentration is too high, it'll either be passive or it'll be absorbed by the tree. The goal then is to hit the mark between being too high or too low to actually have a gain in organic material from the tree. If one wanted to use this technique to harvest sugar from several trees at once using a centralized system, the challenge may only be exacerbated given the variety of trees that one normally finds in a forest, each having the potential to have a different ideal density for harvest. Thus, this particular technique may be more suitable for tree plantations, where planted trees are more likely to be of the same type and age, helping to simplify some of the complexities of differentiating tree types; it may also have applications in agroforestry for similar reasons.

2) Multiple-Injections: The second technique for harvesting solutes from trees is a multi-step process using at least two injections; an investment injection and a recovery injection. The intention of these injections is to allow for solutes to be absorbed by the tree so that they can engage with the tree's cells, then, to recover solutes from the tree with a second injection. For example, one could first inject a sucrose solution into a tree, allow it to engage with the tree's cells that absorbed the sugar, and then have a second injection of water to harvest the solutes from the tree. This water injection enters into the tree to rinse out the solutes that are then collected from the exit port. This technique can be applied to both shade tolerant and shade intolerant trees as both will absorb solutes, with higher a concentration usually necessary for shade intolerant trees to become absorbent with their reaction to solutes rather than passive.

My experimentation shows that this technique works particularly well with solutes such as sucrose, which not only causes an osmotic stress in the tree, but which also causes an enzymatic response as well. Sucrose is a key regulator for the enzymes involved with metabolism in plants. When sucrose is injected into a tree, enzymes within the tree are stimulated. The activation of sucrose related enzymes is a key step in creating a sugar sink within plants for the development for organs such as fruit. Thus, with sucrose present after an injection into the sapwood of a tree, a localized enzymatic response can occur inside the tree which aids in the creation of a sugar sink in the area of injection. My work has shown increases in solutes in both shade tolerant and shade intolerant trees. The second technique has clear advantages over the first in that it works on many types of trees, not just shade intolerant trees. Most forests will have a natural mix of shade tolerant and intolerant trees and it's better to have a technique that can work for both to employ a standardized system.

Both of these techniques can easily be demonstrated by a simple experiment which is described as follows. First, one cuts off a single branch from several different trees that have various shade tolerance ratings; the selected branches should be approximately ¼" at the point where the branch is cut. Second, one takes each collected branch and cuts it again to remove the bottom three inches of the branch, resulting in a single section of branch that has two cut ends. The cut ends of the branch section are an entry and exit point for solution to flow through the cuttings, a pathway through the branch. Third, one firmly attaches flexible tubing to one end of the cut branches to make a water-tight seal between the tube and the branch. Forth, one uses a clamp to place the branch above a container with the tube-side facing up. Fifth, one then adds a few milliliters of sucrose solution into the tube and then connects the open side of the tube to a low-pressure air pump which then pushes the solution down through the branch slowly. Once the solution is collected then one can analyze the effluent from each branch to observe the interaction of solutes with the woody tissue of each tree.

In the analysis, you will likely observe that low-density sucrose solutions will be partially absorbed by the branches of shade tolerant trees. The same solution will likely move passively through the branches of shade intolerant trees, or, in less common occurrences, may have modest gains in solutes. For high-density sucrose solutions, you will likely observe that most branches, regardless of their shade tolerance, will partially absorb the solutes from that solution. With absorbance measured, the last step of the experiment is to run a few milliliters of water through the branches. You can then measure each tree's performance by comparing its total solute content as collected in the effluent.

I have run experiments with cuttings from many different trees along the shade tolerance scale. My results suggest that where a tree falls into the shade tolerance spectrum does not necessarily dictate how solutes will react with that tree's sapwood; this may be especially the case when applied to conifers. Shade tolerance classification is merely a starting place to ascertain which technique may be appropriate to employ on a given tree. To determine which technique to use on a tree, I first reference published information on trees and where they fall into the spectrum of shade tolerance. Then, I take cuttings from the tree and run sucrose injections on the material in the range of 1% to 5% to study if there is a change in the density of the effluent. If the material is typically absorbed, then I will likely use the multiple-injection technique for that tree to harvest solutes. If the material is typically passive, then I may consider using a single-injection method for that tree.

The practical application of shade tolerance for my process extends beyond looking at individual trees. Shade tolerance is a useful way to understand how a group of trees may be employed together for sugar harvest. By grouping trees together in a standardized system, the economic impact of those trees will be much greater than using an individual tree. For example, if a plot of land was selected to harvest sugar from trees, then one would need to know how to use those trees together in a collective system to make the process useful and affordable. If all of the trees on a plot of land could use the same injection solution, delivered to the trees from a shared reservoir, then the system could tie-in every tree on the plot using tubing. Thus, for a collective system, shade tolerance is important when figuring out what injection technique to use to set up the system on a given piece of land. If the trees on the land had similar characteristics, then it may be possible to use a single-injection technique. If the trees on the land had many varying characteristics, then one may wish to default to the multiple-injection technique for reasons of simplicity. Thus, one can know how to approach the application of my process by understanding how solutes typically interact within trees as related to shade tolerance.

When employing my process, holes must be drilled where there is healthy sapwood beneath the outer bark. The best technique for tap placement is to avoid drilling into areas of a tree with obvious injury or decay. Sapwood is where the engagement between an injection solution and a tree's cells occurs. When a solution is injected into the sapwood of a tree, the majority of that solution will travel through thousands of tiny water conducting vessels that run vertically along the tree. These vessels provide the path of least resistance for an injected solution. Thus, if there is underlying damage to these vessels, such as decay, then the flow of solution through the tree from the entry port to the exit port will likely not occur because the interruption in the vessel pathway.

For both techniques, a typical drill hole in a tree may be anywhere from one to ten inches in depth depending on the sapwood thickness, size, species and environment of the tree. A hole may be drilled past the sapwood and into the heartwood to increase flow throughput for a tap if desired. My process can use existing maple sap production equipment, typically made of metal or plastic spiles, often $5/16"$ in diameter with tubing of the same size. The sizing of the equipment may vary depending on the size and species of the tree. Given that sapwood density varies among trees, higher pressure may be needed to overcome the resistance of flow in denser wood. Trees with more resistance to water flow may require larger entry and exit ports, or higher pressure pumps and lines. Every tree that is tapped must have at least one entry port and one exit port; but, one can use several entry and exit ports on a tree if desired. Generally speaking, the larger the tree the more entry and exit ports may be required to sufficiently harvest material from the tree. In all cases, holes must be placed in a close enough proximity to allow for the flow of solution through the tree from the entry port to the exit port. If holes are placed too far away from one another, there may be too much resistance for solution to flow through the tree properly.

My process utilizes any number of standard tubing and piping made from plastic, metal, or a similar material approved for the transportation of water under pressure (typically in a range of 0 to 120 psi) to inject the required solution into the tree. A pump is attached to this tubing network to deliver the solution from a reservoir to any number of trees via the tubing network. Each entry port into a tree is attached to the tubing network. The entry port itself is typically a spile that is hammered into the tree to create a water-tight seal. The exit port is normally made of the same material. The entry and exit ports can be held in place by the tree itself without support. The exit port also has tubing attached to it to collect the solution flowing from the tree. The exit port is not connected to the same pressurized system that the entry port is, rather, solution is allowed to freely flow out of the tree without adding additional pressure. A suction line can be added to the exit port to aid in the collection of the solution from the trees if desired. This type of suction line is something already used in the maple syrup industry to aid sap collectors in acquiring maple sap from trees. Given that there are two networks of tubing involved when tapping trees (one for the entry port and one for the exit port) it is important not to confuse which line goes where on the tree or the system may not function properly.

My process does not have to use sapwood exclusively to create an osmotic response from the tree, heartwood can also work. When one drills into a tree to create entry and exit ports, one can drill past the sapwood and into the heartwood to engage the heartwood in my process. The heartwood, like the sapwood, has vessels for pressurized solution to flow through; drilling into the heartwood accesses those vessels. One may therefore wish to drill into the heartwood to increase the flow rate through the tree for an entry or exit port. The heartwood may be used in my process as long as the vessels of the tree remain open; sometimes heartwood vessels may be blocked by gums, resins, or other materials common to the heartwood in various trees.

When tapping into a hardwood tree, it may be beneficial to allow some time for newly drilled holes to age before injecting solution into them. The benefit of aging the holes is that, once aged, the harvesting system will likely be more efficient than using brand new holes. This is because in some hardwood trees, there are so many water conducting vessels in the sapwood with low resistance to flow, that a solution can easily flow past an exit port. For example, if one drilled two holes into a tree and injected a liter of water into those holes, it wouldn't be surprising for only half of that water to end up flowing out of the exit hole. The rest of the water would likely overshoot its intended exit and move upwards towards the canopy of the tree. By aging the holes before injecting, the tree essentially tries to seal off those holes from the remainder of the tree as a natural response to those wounds. The tree does this by a localized reaction of gum secretion to block off those wounded cells. This action of gumming will add resistance to the flow of solution in the area and help increase efficiency of the process overall. Creating resistance to the flow of water will likely mean the exit port is the path of least resistance for an injected solution.

A simple test of measuring the volume of water into and out of a tree can help show if aging the holes would be advantageous for the process. If aged, one should see an improvement with the ratio of what was injected, versus what was recovered from the holes. An alternative to aging the holes naturally is to inject a gum-like substance into newly drilled holes to artificially bring about the gumming process of those wounds. I prefer pectin for this process as it is a natural gum found in many trees and works effectively in increasing the resistance to flow in drilled holes. Neither natural nor artificial gumming of holes should be applied to trees that are conifers, as their resin will likely block the flow of water completely. When drilling into conifers, their holes should be immediately tapped as to prevent the flow of resin into the new holes.

The action of aging holes naturally and artificially by the injection of gums like pectin will both in turn create a greater resistance to the flow of solution through the sapwood. The amount of pressure needed to push solution through the tree from entry to exit ports may increase greatly. My experimentation suggests that greater resistance to the flow of solution through wood creates a greater absorption ability of solutes from those cells. For example, tree cuttings that I have artificially gummed with pectin often absorb twice as much sucrose per injection relative to untreated (non-gummed) cuttings. I have additionally seen this occurrence with materials that naturally have a greater resistance to solution flow, like conifers, that can absorb sugar easily without the process of gumming. Generally speaking, the greater the resistance to the flow of solution, the more a tree can absorb solutes from an injection.

With regard to entry and exit ports, I have found that drilled holes in trees can be used to access a tree's sapwood for more than one season. I have seen the successful use of drilled holes from a previous season when employing them in my process. For example, during research in September of 2015 I drilled two holes into an American Sycamore to create an entry and exit port for the tree. I used the holes to run various experiments for several weeks, after which, the holes were neglected once cold weather arrived. Nothing was done with the holes after my experiments and as a result the tree formed natural callus tissue in the holes to plug them up. The holes were completely sealed for many months. In September of 2016, a year after the original drilling, I reopened the holes by drilling into them with the same size drill bit to remove the callus tissue from the holes. The drilling removed the callus tissue, but, did not cut into any new sapwood tissue as care was taken to follow the original holes with the drill bit. The reopened holes were then washed and tested for flow and absorbance of injected solutions. I observed a strong absorbance of sucrose from the tree, suggesting a viable section of sapwood between the two reopened holes that the injecting solution was able to engage with.

With the reopened holes, I also discovered a much higher resistance to solution flow compared to the original holes that were drilled. When originally tapped, they had a throughput of 300 milliliters per minute at 40 psi when using water; a year later, they had a throughput of less than 10 milliliters per minute at 40 psi. Reusing holes for more than one season could benefit the tree by not having to wound the tree year after year. It is a common occurrence in the maple syrup industry to have several wounds per tree per year, which can overtime cause major to minor damage to the tree. Maple producers have no choice but to make new holes into the trees because once the wound is healed, the sap flow will stop. This does not appear to be the case with injections, as my research has shown, reopened holes appear to be very capable of engaging with injecting solutions if one removes the callus tissue first.

With regard to injection solutions, many various materials will work for the harvesting of solutes from trees. As long as an injection solution creates an osmotic response from a tree, that solution is likely to be useful for harvesting sugars from the tree. However, what materials one uses in an injection solution may have an impact on how harvest occurs when using that solution. Certain solutes may be more difficult to liberate from a tree during recovery than others. Thus, when dealing with certain injecting solutions, especially those that have plant-based organic materials such as enzymes, efficient harvest may require more than just water for a recovery solution. My research shows that the addition of solutes to a recovery injection may be helpful to prevent the loss of solutes into the tree when using materials that are difficult to harvest, such as plant-based organics.

Plant-based organic materials are likely to end up in an injection solution if there is a cycle involved with the process. A cycle could occur by injecting a solution into a tree and then taking a portion of that solution after it exits the tree and reusing it as the injection material for a sequential round. The benefit of reusing solutes for injections avoids the need to add new material every time an injection occurs. The process would be more sustainable if solutes were recycled. For example, for every harvest that occurs, if half of the solutes could be reused in the process, while the other half used or sold to create revenue, it would tremendously cut down on the resources needed to sustain the process. This would mean a more sustainable technology, requiring fewer external resources.

I have found in my research that to overcome potential losses from injecting solutions with strong absorbent tendencies, one must use more than just water to recover solutes efficiently. By adding solutes to water to create a recovery solution, it will help in liberating material within the tree for harvest. For example, I have often seen that using a low-density salt solution will be sufficient to use as a recovery solution to release material from trees that have used recycled sugar as the initial injection. Using salt will provide the recovery solution with an osmotic potential to engage tree cells that water simply does not have.

My invention was created as a way to harvest sugar from trees; however, because of the complex way a tree will engage with an injection solution, there will usually be byproducts from my process. From my research, I have found byproducts with economic value. These byproducts arise from how the tree responds to the solutes from an injecting solution. Although sugar is the target material for my process, I often find other solutes in the solutions I harvest from trees such as enzymes. Byproducts from the process, like enzymes, could either be isolated from the solution harvested from trees or they could be used in conjunction with the other solutes that were harvested, depending on the application. A typical solution that is recovered from a tree may include; water, sugars, proteins, phenols, amino acids, organic acids, salts, minerals, and exudates from the tree.

If a byproduct from an injecting solution was of particular value or interest, such as an enzyme, then my process could even be manipulated to target that particular organic material for harvest instead of sugar. Thus, my process could be redirected to glean non-carbohydrate organic materials as the target solute for harvest. To harvest non-carbohydrate solutes, an injecting solution's objective would be to engage the cells in the tree to stimulate and activate a particular cellular process within the tree. The energy needed for the cellular activity to create the product comes from both the tree and its sugar supplies, or, supplemental sugar is supplied with the injection to drive the needed cellular activity. It is likely that whatever the target solute is, carbohydrate or non-carbohydrate, there will be non-targeted materials in the final solution that would have to be removed to obtain a pure product.

My research has shown that both carbohydrate and non-carbohydrate solutes can be harvested from trees. I have likewise seen similar results of solute interactions with woody material cut from trees. This cut material, once removed from the tree, is an independently functioning group of living tree cells that have the ability to engage with injected solutes. If one connected the cut material to allow for the flow of solution through the wood, it could begin the process of engaging those cells for targeted harvest. The energy to drive cellular activity within this cut material is limited since that portion of the tree is no longer connected to a sugar source (i.e. leaves); thus, cellular activity can only last as long as there are carbohydrates within the cells of the harvested material. As a result of limited carbohydrates, this particular method of using woody material for solute harvesting can be divided into two categories, temporary and non-temporary. The temporary activity harvest solutes from the wood until carbohydrates are spent, then one can use the wood for other purposes (e.g. timber, firewood). Non-temporary activity can harvest solutes for a longer period of time if one supplies a carbohydrate supply to the cut material via injection. Those carbohydrates could be supplied before, during, or after other injections, as long as the cells have the opportunity to restock their energy supplies.

For non-temporary harvest, if sufficient moisture and carbohydrates are supplied to the cut material, then it can be used for an indefinite length of time since those tree cells have the resources to stay alive and to continue to produce the desired solute. Once removed from a tap, the wood could be used for other purposes. For both temporary and non-temporary options, freshly cut material is needed to operate this process as the cells within the cuttings need to be alive. If the wood cuttings are old, the cells are likely to be dead and it won't be suitable material for product development.

With temporary and non-temporary harvest using cut material, the size of the cutting should be of a sufficient size to make the process economical. A large branch, a section of a trunk, or other large cuttings, may be more cost-effective when harvesting solutes from cut material. Since the vascular system of a tree runs from the roots to the crown of a tree, the length and size of the cutting can vary from small to very large, since there are vessels that solution can flow through all along the tree. As long as solution can flow through the wood, then an injection solution can engage tree cells for solute harvest. With larger pieces of wood, high pressures will likely be needed to push the solution through the vascular system. By using large pieces of wood for solute recovery, there may be an option to use injections as a means for developing co-products for the timber industry. For example, injections can be used to recover solutes from wood, prior to it being sent through a sawmill. This would create an additional revenue streams for timber producers.

When producing non-carbohydrate products using standing trees (trees that are living and growing) the sugar needed to run cellular activity can come from photosynthesis. With a replenishable supply of sugar, the process is more self-sustaining than the cut material process, which would require a sugar supply after a while. Standing tree and cut material processes both are limited in the type of products they can produce from injections. The products will vary from tree to tree and are limited to what organic material the cells of that tree can naturally produce.

When harvesting solutes using cut material, it may be beneficial to remove some of the bark at the end of the cutting to allow for a smoother end for the attachment of tubing. Often, bark is thin enough for tubing to slide onto the material to create a water-tight seal when using small pieces of wood. However, larger pieces of wood may have rough bark, making a water-tight seal impossible. In this case, bark must either be partially removed with a knife or other tool to smooth out the surface of the tubing attachment area. Alternatively, if the bark is rough and the wood a sufficient size, one can forgo tubing and use a tap to access the sapwood instead.

I have observed in my research that certain injections can cause different products as a response to the solutes used. For example, I took cuttings from a *Camellia* plant with the intent to see how those various injections preformed at degrading starch. I injected two different sugars into the cuttings, sucrose and dextrin, to study each effluent in its ability to degrade starch that had been gelled. My results showed that starch was degraded from the tube that had a dextrin injection but not from the tube that had a sucrose injection. Thus, one can deduce through experimentation what solutes to use to target particular products. Likewise, I have also noticed in my research a strong production of product from recycling material through cuttings. For example, I observed that running a glucose solution through a Maple cutting several times caused an overall decrease in sugar and overall increase in crude protein material each time the solution passed through a cutting; thus, sugar was converted into protein. These types of results suggest that an economical production of product could exist by using my process.

For my process, solutes are normally required to harvest materials from trees as they are needed to create an osmotic response for harvest. However, there are exceptions when solutes can be recovered from trees using water as an injection solution. Using water for the harvesting of sugar from trees is typically an abnormal technique because water usually does not contain enough dissolved materials to meet the threshold of solutes needed to create an osmotic response. Fresh water normally does have some dissolved material in it, but, my process usually adds more solutes to an injection solution to meet the threshold required for harvest. When using water, it washes away any free material from the wood as the water travels through the wood's vessels. I have used water as a single-injection solution to recover solutes when tapping into the trunks of some trees, such as conifers like Pine, or monocots like Dracaena. I have also used it when injecting cut material from many various kinds of trees, as free soluble materials are often available to be washed out from the stems of trees. Using water for an injection solution has limited applications for my process compared to the solute-based method. The main disadvantage of using water is that the overall reaction is not very strong as compared to the solute-based method; thus, the overall yield when using water compared to a solute-based method is typically lower.

In conclusion, we can see the potential that forestry resources have for the development of organic materials through the process of injection. Although injections into trees are nothing new, the objective of my process is new. Prior work dealing with the injection of trees has been mainly focused on health benefits to the tree, such as an application of pesticides or an injection of sugar to aid in growth. What makes my process novel is the intent of gaining, or harvesting, through injection. My process does not intend for the tree to keep the injected solution (such as an injection for health benefits), but rather to take in solutes and then to give them back in a richer state, or, in an altered state. In my process, I add a second hole to a tree (an exit) so that what I put into it can flow out for harvest. Thus, my intent is the utilization of trees for the production of organic materials through the injection of solutes.

Example 1

Six trees were selected to study the interaction of sucrose with woody material cut from those trees. The selected trees were chosen based on their shade tolerance ranking, with two trees from the tolerant category, two from the intermediate category, and two from the intolerant category. All materials were harvested in August 2016 from Lexington County, S.C. using a limb cutter. Once harvested, each branch was cut again to create a three-inch section of branch with two ends. These branch sections were then weighed to ascertain the mass of the cutting. Once weighed, a clear vinyl tube with a ¼" inner diameter was firmly pushed onto one side of the cut branch to create a water-tight seal. Next, each stick was suspended above a test tube. Then, one milliliter of a 50% sucrose solution was added into the tubes. Each tube was then attached to an air pump so that the air pressure would in turn push the sucrose solution through the stick. Air pressure applied to each tube varied according to wood density, with the goal of getting a slow dripping effect from each stick.

Once the solution had passed through the stick, the density of the effluent from each tube was measured using a Milwaukee MA871 Refractometer. When subtracting the measured density from each tube from the original density of the injection, one could calculate how much of the injection each stick absorbed. For example, if the effluent from a test tube measured 22%, one could subtract that amount from the starting culture of 50%. Density times volume calculated solute mass; (50%×1 ml=0.5 grams), (22%×1 ml=0.22 grams), thus (0.5 grams−0.22 grams=0.28 grams). This calculation showed that the stick absorbed 0.28 grams of solutes from that injection. Each effluent was measured for density from which it was determined how much solute each stick absorbed.

After the first injection, each stick was placed into new test tubes. Ten milliliters of distilled water were added to each tube for the recovery of solutes from within the stick. Each tube was reconnected to the air pumps which pushed the water through each stick using air pressure. Once the water was through, the density of the effluent was then measured again using the refractometer. As before, density times volume yielded total solute mass from each tube. For example, if the density from the effluent was 2.2%, one could calculate (2.2%×10 ml=0.22 grams) to find the yield of solutes from that stick. By comparing the mass of the solutes from what was absorbed in the first sucrose injection, to what was gained in the second water injection, I was able to calculate how each cutting preformed in solute yields. Table 1 shows the results of the experiment.

TABLE 1

Experiment of sucrose exposure to woody material from various trees

| Tree | Shade Tolerance | Fresh weight of stick | Solutes Absorbed from Sucrose Injection | Solutes Yielded from Water Injection | Gain in Solute Mass |
|---|---|---|---|---|---|
| American Holly | Very Tolerant | 3.3 grams | 0.306 grams | 0.36 grams | 17.6% |
| Red Maple | Tolerant | 3.5 grams | 0.165 grams | 0.23 grams | 39.4% |
| American Sycamore | Intermediate | 3.0 grams | 0.234 grams | 0.31 grams | 32.5% |
| White Oak | Intermediate | 3.9 grams | 0.075 grams | 0.12 grams | 60.0% |
| Tulip Poplar | Intolerant | 2.7 grams | 0.196 grams | 0.23 grams | 17.3% |
| Post Oak | Intolerant | 3.9 grams | 0.079 grams | 0.15 grams | 89.9% |

See FIG. 1 for reference to proceeding letters and their corresponding parts. A visibly healthy American Sycamore tree located in Lexington County, S.C. was selected for this experiment. The tree, Tree A, is approximately twenty-two years old and is medium-sized with a trunk circumference of fifty-six centimeters at breast height. The tree is partly shaded by the canopy of taller pines located within the vicinity. A spot on the tree was chosen for tapping near the base of the tree. Three holes are drilled into the tree using an electric drill with a drill bit of 5/16". Each hole is nine centimeters deep and is spaced three centimeters apart along the trunk, aligned vertically one above the other. The bottom hole is located eighteen centimeters from ground level. Once the holes are drilled, they are left to age for nineteen days before the experiment is run. During this time, the holes begin to undergo the process of healing, causing resistance to the flow of liquid in the sapwood.

After several weeks, with the holes properly aged, the experiment began mid-day on Aug. 7, 2016; a hot day with temperatures of 33° C. at the time of the experiment. A hammer was used to drive three spiles into the three holes created by the drill weeks before. The action of hammering in the spiles created a water-tight seal for an entry port, Port B, and two exit ports, Port C & D. The entry port is placed in between the two exit ports in this experiment. The entry port spile is connected to a piece of tubing, Tube E. The exit port spile for both Port C and Port D are connected to a piece of tubing, Tube F and Tube G respectively. Tube F and Tube G connect to an empty plastic bottle acting as a collection vessel, Vessel H, where solution exiting the tree is temporarily stored.

Throughout the course of this experiment, three solutions were injected into the tree. The first injection was water, the second injection was a high-density sucrose solution, and the third injection was water. The first step in the experiment was to wash the holes of Tree A with water. A pump sprayer, Pump I, is used for the first injection. The pump is filled with tap water and then pressurized by hand through pumping of the pump's handle up and down; this pushes air into the chamber of the pump and therefore raises its pressure. Pump I was then collected to Tube E to access the entry port, Port B, which is the pathway into Tree A for this experiment. The pump was left to inject water into the tree for thirty minutes to wash out any impurities from the drilled holes. The solution that exited the tree at the exit ports was discarded.

The second step in the experiment was to switch out the pump with an identical pump, Pump J, filled partially with a 60% sucrose solution, to pressurize the pump, connect it to Tube E, and then to inject the sucrose solution into Tree A through Port B. The solution was slowly injected into the tree for 15 minutes. Over that time, 42 milliliters of the sucrose solution were injected into the tree, exiting the tree at Ports C & D to be collected in Vessel H. The density of the exiting solution was measured using a Milwaukee MA871 Refractometer. Through comparison of the densities of the original solution vs. the exiting solution, it was determined that 4.28 grams of solutes were absorbed by Tree A.

Once a sample was taken from the effluent of the first exit, the solution in Vessel H was discarded. The bottle was quickly rinsed using hot tap water and then replaced with Tubes F and G reconnected to it. Pump J was then removed from Tube E and replaced with the original pump filled with water, Pump I. The pump was pressurized, then connected to Tube E. Water was then injected into the entry port for ten minutes to harvest the solutes from Tree A. Water flowed through the tree from the entry port to the exit ports and was then collected in Vessel H. The refractometer was used to measure the density of the effluent from the second injection. Over the timeframe, 355 milliliters were collected with a density of 2.2%. Thus, 7.81 grams of solutes were harvested from Tree A. By comparing the mass of solutes that were absorbed by the tree during the first injection and the mass of solutes harvested from the tree from the second injection, I calculated the gain of solutes from the experiment to be 82.3%.

Example 3

Ten injection solutions were selected to study how various solutes interact with cuttings from a Red Maple tree. The goal of the study was to determine how well each solution preformed with harvesting solutes from the woody material collected. All cuttings were harvested from the same tree in August 2016 from Lexington County, S.C. using a limb cutter. Once harvested, each branch was trimmed down to a three-inch section and weighed to ascertain the mass of the cutting. Once weighed, a clear vinyl tube with a ¼" inner diameter was firmly pushed onto one side of the cut branch to create a water-tight seal. Next, each stick was suspended above a test tube. Then, one milliliter of each solution was added into individual test tubes for all ten variables being studied. Each tube was then attached to an air pump so that the air pressure would in turn push the sucrose solution through the stick. Next, nine milliliters of distilled water was added to each tube for the recovery of solutes from within the stick. Each tube was reconnected to the air pumps which pushed the water through each stick using air pressure. Once the water was through, the density of the effluent from the combined discharge of both the first and second injections (10 milliliters total) was measured using a Milwaukee MA871 Refractometer.

TABLE 2

Exposure of various solutes to woody material from *Acer rubrum*

| Injected Material; 30% density | Fresh Weight of Stick | Mass of Solutes Gained or Lost | Harvest as a Percentage of Fresh Weight |
| --- | --- | --- | --- |
| 1. Sucrose | 2.7 grams | 0.05 grams | 1.9% |
| 2. Glucose | 3.0 grams | 0.06 grams | 2.0% |
| 3. Dextrin | 3.4 grams | 0.08 grams | 2.4% |
| 4. Urea | 2.7 grams | 0.04 grams | 1.5% |
| 5. MgSO4 | 2.9 grams | 0.09 grams | 3.1% |
| 6. NH4SO4 | 3.8 grams | 0.09 grams | 2.4% |
| 7. Maple Syrup | 2.9 grams | 0.05 grams | 1.7% |
| 8. Maple leaf extract with sucrose | 3.7 grams | 0.04 grams | 1.1% |
| 9. Maple wood extract with sucrose | 3.5 grams | 0.02 grams | 0.6% |
| 10. Recycled material from previous injection | 3.8 grams | −0.02 grams | −0.5% |

The injection solutions used in this experiment fell into three main categories; sugars, salts, and plant-derived material. Each solution was made to be a 30% density for easy comparison of how well the solutes preformed, the results of which can be found in Table 2. The results suggest that sugars and salts generally performed better than plant-derived material when water is used as the recovery solution. When plant-based material was used, it caused a reaction with the maple cuttings that made solute recovery harder. Thus, a solute-based recovery solution would be recommended for more efficient recovery in this situation. With this in mind, I was able to redo the 10th injection using a new piece of woody material. Using a 1% magnesium sulfate recovery solution, I saw gain in solutes instead of a loss.

The creation of solutions 8 and 9, the maple leaf and maple wood extractions, were made by pouring boiling water over collected material from the maple that was torn or cut into small pieces. The material was allowed to steep for 20 minutes before being filtered. After, high density sucrose was added to the filtered solution until the density reached 30%. Injection 10 was made by running a high-density sucrose solution (70%) through a piece of maple wood, and then collecting the effluent. This effluent was then taken and adjusted with distilled water until a density of 30% was reached.

Example 4

Solutes harvested from a tree were collected to use for a fermentation study to see how useful solutes harvested from trees would compared to a control solution of purchased sucrose. An injection of sucrose into an American Sycamore tree was recovered with an injection of water, resulting in a solution of 411 milliliters at a density of 3.7%. Of this, 300 milliliters were set aside for fermentation. A control solution of 300 milliliters was made using purchased sucrose to 3.7%, the same density as the solution recovered from the Sycamore. Both solutions had one gram of dry yeast added, then, were left alone for 15 minutes while the yeast rehydrated. The yeast used in the experiment was a Red Star product, Pasteur Champagne dry yeast, a strain of *Saccharomyces bayanus*, a common wine and cider fermenting yeast.

After the yeast became hydrated, both solutions were agitated and samples collected to ascertain the starting density of each solution; for both solutions the starting density was 3.8%. The samples were then left to ferment for 36 hours at room temperature, being agitated periodically. After the 36 hours, the bottles were agitated one final time and then samples from both solutions were centrifuged. The resulting final density was 1.1% for the harvested solute solution derived from the sycamore, and 1.2% for the sucrose control solution, a negligible difference. Two milliliters of the centrifuged solution were then added to a test tube for an iodoform test, which tested strongly positive for the presence of ethanol by the yellow precipitate that appeared after several minutes. A few drops of this were placed onto a microscope slide to confirm the crystalline shape of iodoform as a second validation.

These results suggest that the solutes harvested from the Sycamore were very consumable by the yeast, portraying their value as a substrate. Likewise, these results also suggest that byproducts from the process do not interfere with the use of the sugar.

Alternative embodiments to my invention may include:

When tapping a tree, one can use tubing and spiles other than the standard 5/16" sizing previously described in the specification. Given that trees vary in size and wood density, various trees may require larger or smaller taps than the standard 5/16" spile.

If a large area of forest is being utilized for solute harvest, then a larger framework of pipes may be utilized to supply the greater quantities of solution needed for the system. Lines can be distributed throughout a forest to connect many acres of trees onto one system. The system of pipes may include main lines of pipe that feed into smaller sections of piping and tubing. The size of the piping and tubing network depends on the size of the area being harvested; the delivery and recovery system can be scaled up or down accordingly.

To facilitate the flow of solution into a tree, especially in the case when more than one solution is being used, one can have a dedicated tubing system to aid with the logistics of the process. For example, two entry ports could be used on one tree, placed next to one another; one port would be used for the injection of one solute (e.g. sucrose or other solutes), the other could be used for a second injection (e.g. water or other material). Both of the injections would have the same intended pathway, leaving the tree at the same exit port; this would engage the same section of the tree's sapwood. For such a process, one should add a check valve to each tube so that solution does not backflow into the other line during injections. Only one line should be pressurized at a time to allow for proper flow. The first line, once its solution was pushed through the tree, would then depressurize. Next, the second line then pressurized to push its solution through the tree. Alternatively, a different setup could be engaged where two tubes carrying different solutes could use the same entry port by sharing a three-point junction, with the third point being inserted into the tree. Check valves placed on both tubes would prevent the backflow of solution from one line to another.

A number of different solutes can be used to achieve the desired result of harvesting sugars from a tree. It does not have to be one special combination of solutes; rather, it can be multiple combinations of solutes to best meet the demands of a particular environment or tree.

When doing a multiple-step injection, one does not have to use water for the second injection. A second injection could contain solutes.

In softwood trees, solution pumped into the tree flows more bi-directionally (up and down) than in hardwoods which have a general upward flow. For some softwood trees, an entry port may be placed in the middle of two flanking exit ports both above and below the entry port.

In hardwood trees, when taps naturally age and begin to accumulate gummy material, they often change their flow to be more localized than before. The path of least resistance for solution flow may change from being predominantly upward if there is a more open pathway. When using aged taps in hardwood trees, or taps that have been artificially gummed through injection, tap placement can either be above, or in the middle of vertically flanking taps.

Any number of spiles can be used for tapping. There does not have to be just one entry port and one exit port, there can be many on a tree located at various points on the tree.

Positive pressure does not have to be used exclusively for this process to work. Negative pressure from a vacuum may be used to pull solution from an entry port to an exit port. Likewise, a positive pressure from a pump may be used together with negative pressure from a vacuum to create a flow through the tree.

Sugar harvested from trees using my process does not have to come explicitly from leaves. Sugar can flow to an established sugar sink from any sugar source, including roots and other woody material within the tree that has sugar reserves.

The process does not have to be seasonal. The process could occur in a year-round process if the environment in which the tree grows is warm enough to sustain photosynthesis all year. Also, the trees would need to keep their leaves/needles year-round.

The process does not need to use a particular type of pump to deliver solution to the entry port. Any kind of delivery system designed for the movement of fluid can be employed as long as the solution enters into the tree under sufficient pressure for the process to work.

The process is not limited to what is normally classified as a tree, it extends to other wood-bearing plants that do not fit the common perception of what a tree is; these plants contain living wood cells and that is the necessary element to harvest organic materials.

To gain access to the sapwood of a standing tree, one does not have to explicitly drill into the trunk of a tree to create a pathway into said tree. One can alternatively cut off a branch from the tree, leaving behind a stub of the branch that could then act as an entry or exit port for that tree. Tubing would be attached to the branch and solution would flow into or out of the tree from the branch stub. If two branches were used, it would provide a complete pathway for the flow of solution into or out of a tree via injection. The branches would need to be vertically aligned for solution to flow properly. One could use a combination of branches and drilled holes to create a customized pathway for a tree. When placing the tube on the branch, proper tube sizing will be needed so that the tube will fit over the branch snugly to create a water-tight seal. If the bark of the branch is thick or rough, it can be partially or completely removed to create a smooth shaft for the tube to slide onto. One can also use a hose clamp to insure the tube will remain affixed to the stub; no other materials are needed. When one creates a pathway into a tree using branches, one would need to note the position of the branch in relation to the trunk of the tree to mark the entry and exit ports. For most trees, branches will be angled slightly upward from the trunk as they are angled upward to the sun. This means that a solution injected into a tree, through a branch stub, which is acting as an entry port, will enter into the tree downward, opposite of the angle of the upward facing branch. Thus, normally the entry port will be placed above the exit port when using branches for sapwood access unless the tree happens to have a downward facing branch.

I claim:

1. A process for harvesting compounds selected from the group consisting of sugars, proteins, aromatics, organic acids and mixtures thereof from sapwood or heartwood of a tree or a recently pruned section of a tree therefrom comprising:
   a) creating at least one entry port and at least one exit port that accesses vascular structure present in the sapwood or heartwood;
   b) attaching tubing to the entry port and tubing to the exit port;
   c) firstly, pumping under pressure causing a flow of a first aqueous solution having a solute selected from carbohydrates, plant extracts, protein, amino acids, organic acids, inorganic salts or mixtures thereof through the tubing into the entry port, and into the vascular structure of the sapwood or heartwood, creating an artificial sink near the entry port and thereby, a sink pathway and secondly, pumping under pressure a flow of a second aqueous solution from the entry port to harvest the compound from the sapwood or heartwood and to the exit port;
   d) recovering the second aqueous solution with the compound from the sapwood or heartwood through the tubing attached to the exit port; and
   e) collecting the compound in a collection vessel.

2. The process of claim 1 further comprising applying suction at the exit port.

3. The process of claim 1 further comprising imparting flow resistance to the pumped solution by adding gum.

4. The process of claim 1 wherein the creating step includes drilling vertically aligned holes.

5. The process of claim 4 further comprises aging the drill holes.

6. The process of claim 4, further comprising driving spiles into the drilled holes and attaching tubing to the spiles.

7. The process of claim 1 wherein the pressure is in a range from 0-120 psi.

8. The process of claim 1 wherein steps a) and b) involve more than one tree, each having at least one entry and one exit port, and steps c) and d) cause the aqueous solution to flow from the respective entry port on each tree to the respective exit port on that same tree.

9. The process of claim 1 wherein the solute is sucrose and the sink is a sugar sink.

* * * * *